United States Patent [19]

Kuriakose

[11] 4,021,529

[45] May 3, 1977

[54] NON-CATALYTIC SYNTHESIS OF SILICON OXYNITRIDE

[75] Inventor: Areekattuthazhayil K. Kuriakose, Niagara Falls, Canada

[73] Assignee: Norton Company, Worcester, Mass.

[22] Filed: Oct. 21, 1975

[21] Appl. No.: 624,419

Related U.S. Application Data

[63] Continuation of Ser. No. 421,966, Dec. 5, 1973, abandoned.

[52] U.S. Cl. .................................. 423/325; 106/55
[51] Int. Cl.² .......................................... C01B 21/06
[58] Field of Search ............... 423/325, 385; 106/55

[56] References Cited

UNITED STATES PATENTS

| 2,636,828 | 4/1953 | Nicholson | 106/55 X |
| 3,639,101 | 2/1972 | Washburn | 423/325 |

FOREIGN PATENTS OR APPLICATIONS 1,168,499  10/1969  United Kingdom ............... 423/344

OTHER PUBLICATIONS

Guzman et al., "Synthesis of Silicon Oxynitride", Ogneupory, No. 3, Mar. 1970, pp. 177–182.
Goursat et al., "Rev. Int. Temper. et Refract", 1971, t. 8, No. 2, pp. 149–154.

*Primary Examiner*—Edward J. Meros
*Attorney, Agent, or Firm*—Rufus M. Franklin

[57] ABSTRACT

Silicon oxynitride, $Si_2ON_2$ is made, without the need for a catalyst such as CaO, by heating a mixture of powdered silica and silicon in an inert atmosphere at a temperature below the melting point of silicon, and subsequently nitriding the mixture to form silicon oxynitride with minimal silicon nitride contamination.

2 Claims, No Drawings

NON-CATALYTIC SYNTHESIS OF SILICON OXYNITRIDE

This is a continuation of application Ser. No. 421, 966 filed Dec. 5, 1973, now abandoned.

FIELD OF THE INVENTION

A non-catalytic method for the production of silicon oxynitride, in substantial yield, is herein disclosed and claimed.

BACKGROUND OF THE INVENTION

Silicon oxynitride, $Si_2ON_2$, is a refractory material of highly desireable properties for the fabrication of parts such as nozzles, tubrine blades or other structural elements subjected to stress under conditions of high temperature or subjected to highly chemically active environments particularly at high temperature. Silicon oxynitride powder also has utility per se as a refractory and chemically inert material (e.g. as a powdered anti-stick coating).

Present commercial processes for making $Si_2ON_2$ require the use of an alkaline earth metal oxide catalyst for effective conversion of the mix to a resonably high $Si_2ON_2$ content, with a minimum of silicon nitride contamination. One such catalyzed process is disclosed in U.S. Pat. No. 3,356,513.

It is an object of the present invention to provide a method of making silicon oxynitride, of relatively high purity, which does not require the use of a catalyst.

SUMMARY OF THE INVENTION

The process of the present invention comprises mixing finely divided silica and silicon, ideally in the ratio of 3 moles of silicon per mole of silica, preconditioning the mix for nitridation by heating it in an inert atmosphere to below the melting temperature of silicon, but at a high enough temperature to cause sintering of the mixture of powders, and finally nitriding the preconditioned mixture.

The overall reaction stoichiometry is represented by the reaction:

$$3Si + SiO_2 + 2N_2 \rightarrow 2Si_2ON_2$$

However, if a mixture of silicon and silica powder is nitrided, by exposure to nitrogen from room temperature to reaction temperature (around 1450° C), the reaction of silicon with nitrogen to form $Si_3N_4$ is also considerable, in addition to oxynitride formation. It is speculated that the step of preconditioning the mix by heating in an inert atmosphere causes the surface of the silicon to be protected from the nitride formation by the following reaction:

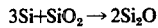

$$3Si + SiO_2 \rightarrow 2Si_2O$$

It is believed that $Si_2O$ is an unstable silicon surface complex which effectively blocks the substantial production of nitride. Although this reaction takes place only on the silicon surface when the thus preconditioned mix is subjected to nitridation, at a temperature around the melting point of silicon, additional surface complex appears to be formed thus continuing to block the formation of silicon nitride.

The nitridation of the mix can be carried out after cooling and crushing the sintered mixture, or the nitridation can be carried out without cooling the sintered mix. Such expedient can be resorted to when it is desired to make articles directly to shape by pressing the mixture of silicon and silica to shape, with or without the incorporation of a temporary binder. Although the preferred ratio of silicon to silica is 3 to 1 (on a mole basis) larger amounts of silicon may be employed, particularly if the nitriding atmosphere will contain oxygen.

The silica may be any high purity form of $SiO_2$.

EXAMPLES OF PREFERRED EMBODIMENTS

EXAMPLE 1

An intimate mixture of 58.5% by weight of silicon powder (finer than 200 mesh) and 41.5% by weight of silica (silica sand, finer than 200 mesh) was prepared. A 3 gram sample of the mixture was placed in an alumina crucible and heated in an argon atmosphere at 1400° C for 1 hour. The product was cooled in argon, and the mass, which was sintered together, was taken out and crushed into a powder. The powdered material was transferred back into the alumina crucible and heated in nitrogen gas to about 1400°–1450° C and held at that temperature for 3-½ hours. X-ray analysis showed silicon oxynitride as the major constituent with small amounts of silicon, silica, and alpha and beta silicon nitride.

EXAMPLE 2

A 3 gram sample of the above mixture was placed in an alumina crucible and heatd in argon at 1400° C for 1 hour as in Example 1. At the end of the 1 hour, nitrogen was introduced into the system and the argon was shut off. The crucible and contents were held at 1400° –1430° C for 4 hours. X-ray analysis of the product showed silicon oxynitride as the major constituent with small amounts of silicon, silica, and alpha and beta silicon nitrides.

As taught herein no catalyst is required in this invention. Thus reaction mixes need contain no alkaline earth oxide. Some trace amounts may be present in the reactants but in any case the amount will be less than 0.1% by weight.

What is claimed is:

1. A method of making silicon oxynitride from a mixture consisting essentially of finely divided silica and silicon in the ratio of 3 moles of silicon per mole of silica, and containing less than 0.1% by weight of alkaline earth oxides comprising:
   1. first heating said mixture in an inert atmosphere at about 1400° C to form a "sinter" or "cake" while avoiding melting of the silicon, for a time at least sufficient to form a film of silicon oxide on the silicon particles in the mix, followed by
   2. crushing the cake to a powdered state and
   3. reacting said mix with nitrogen at a temperature of from 1380° C to 1470° C to form $Si_2ON_2$.

2. A method as in claim 1 wherein the inert atmosphere is argon.

* * * * *